INVENTOR:
LESLIE HARKNESS
BY
Yount, Flynn & Tarolli
ATTORNEYS

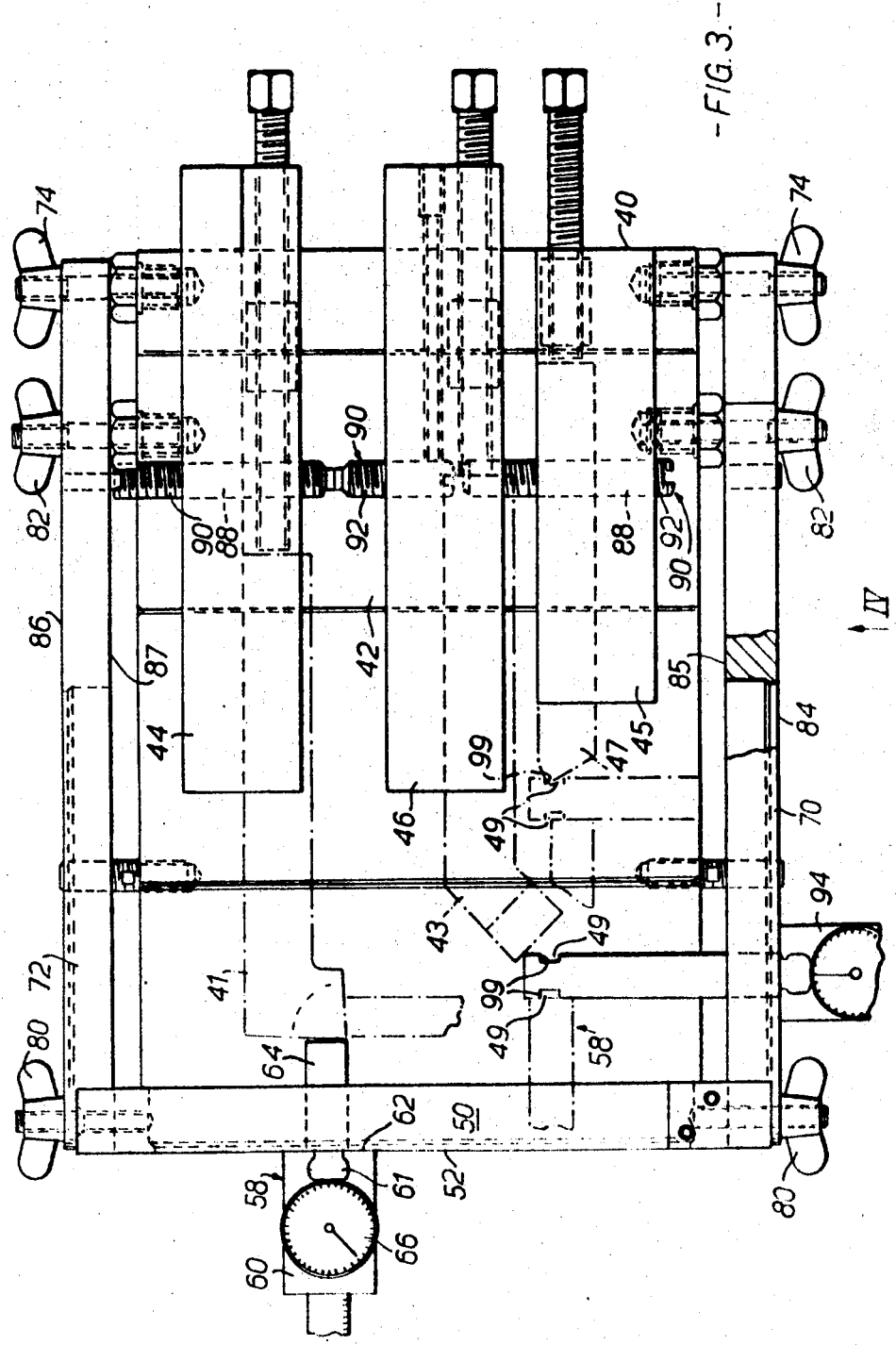

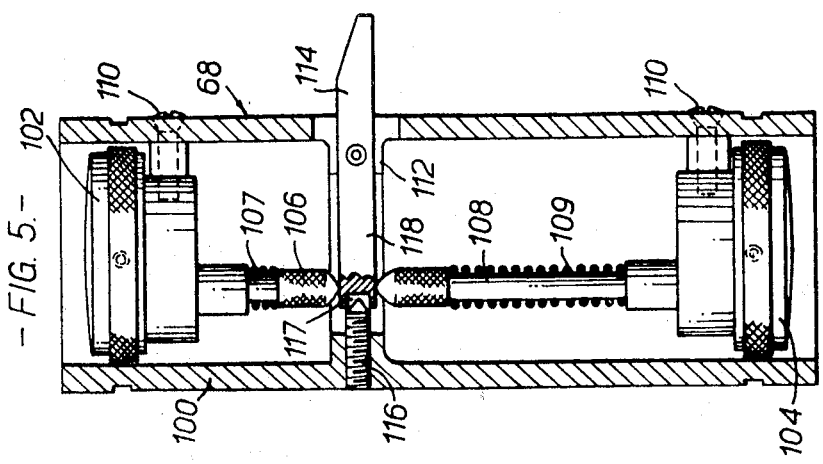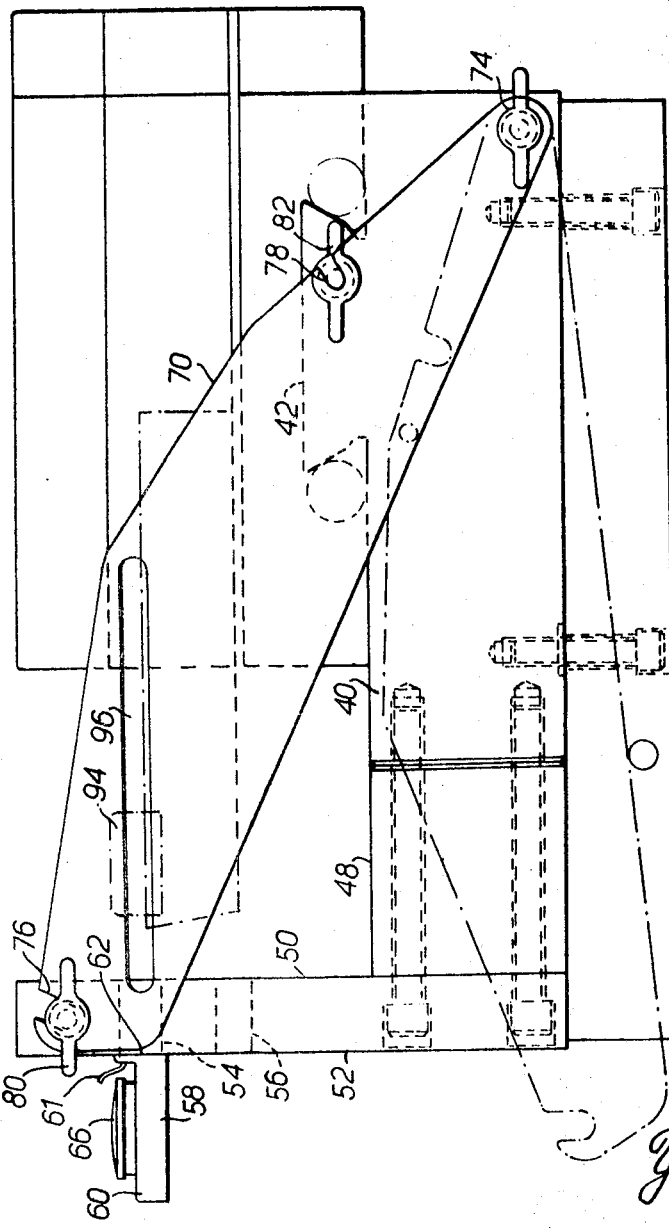

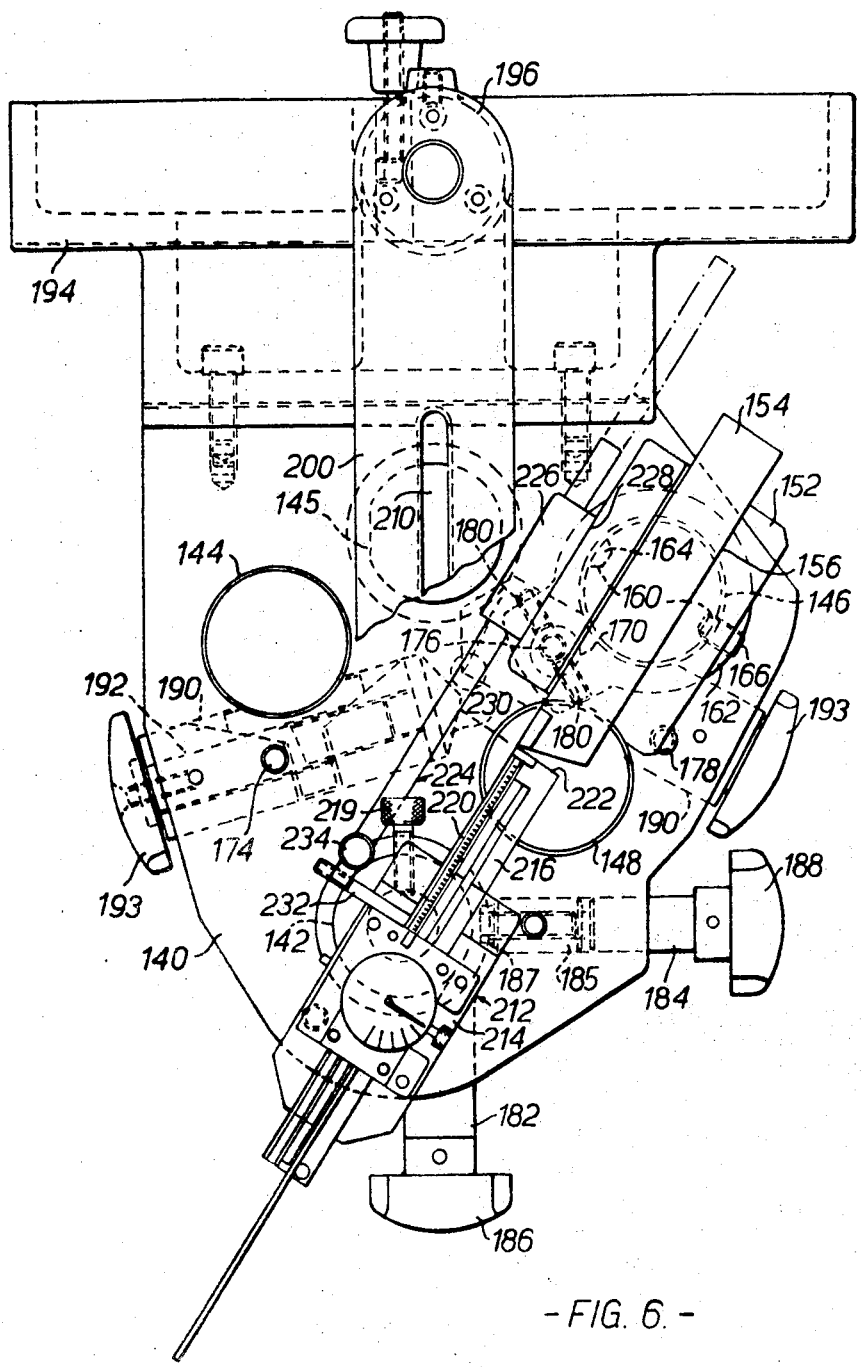
- FIG. 6. -

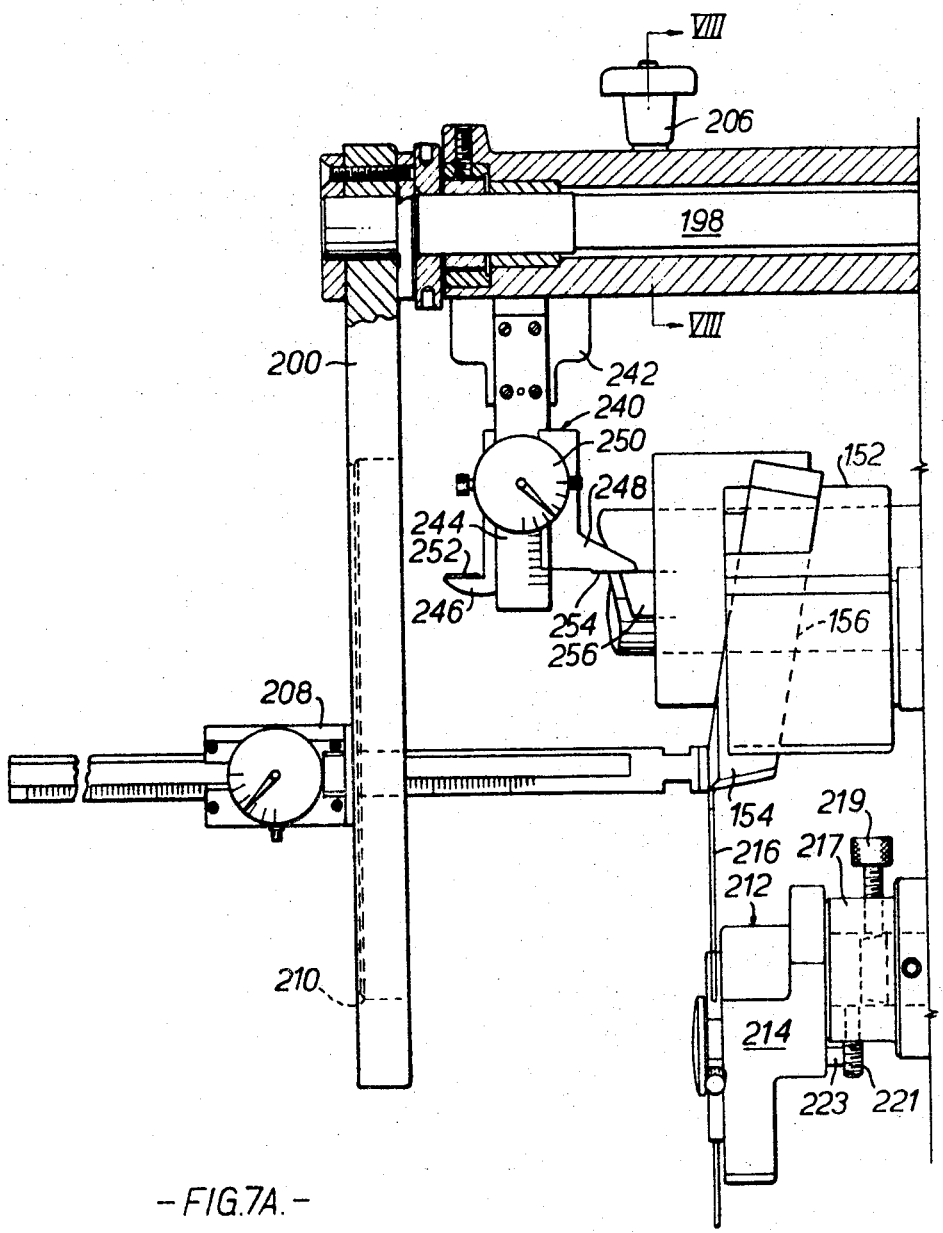

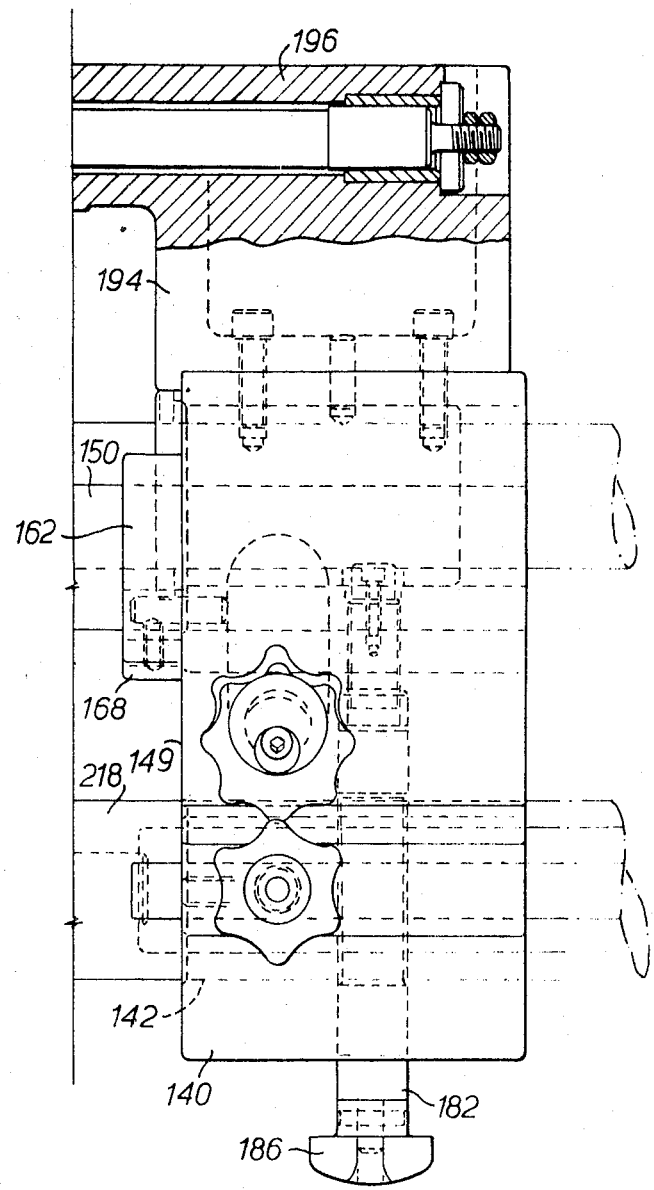
-FIG.7B.-

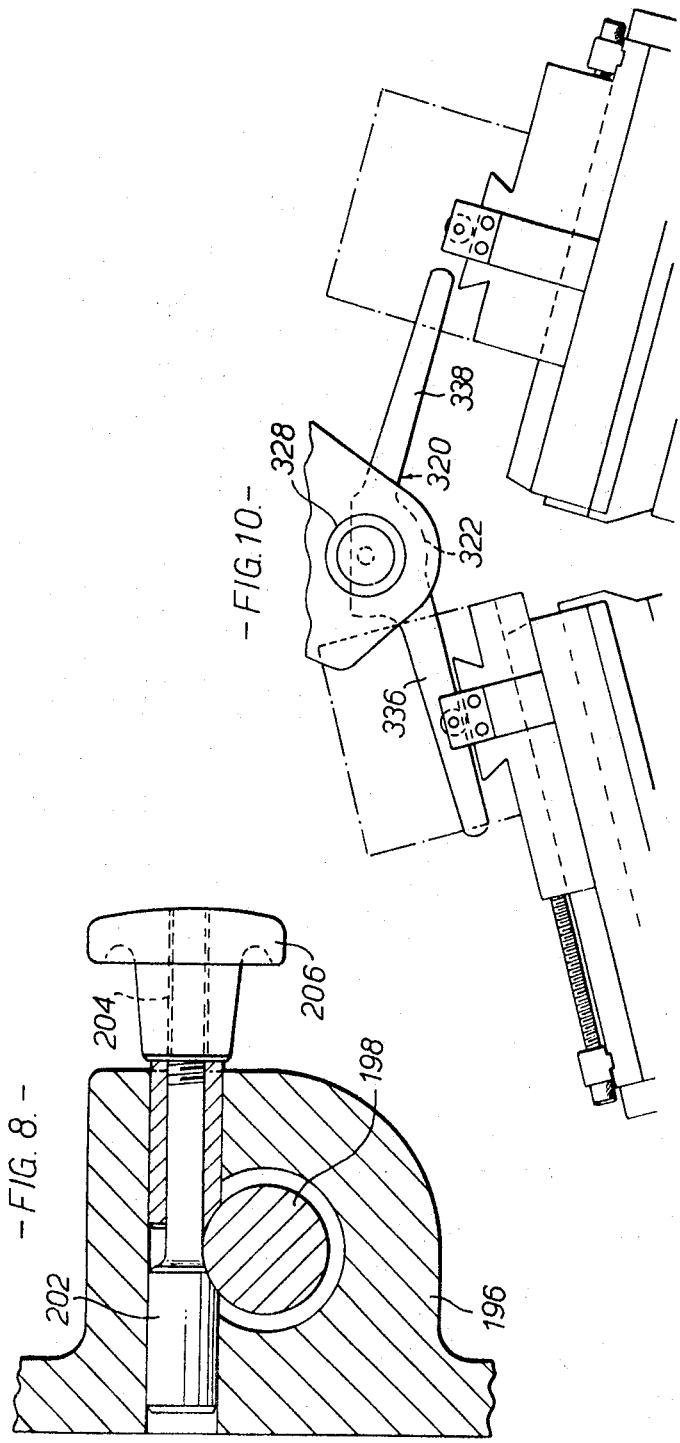

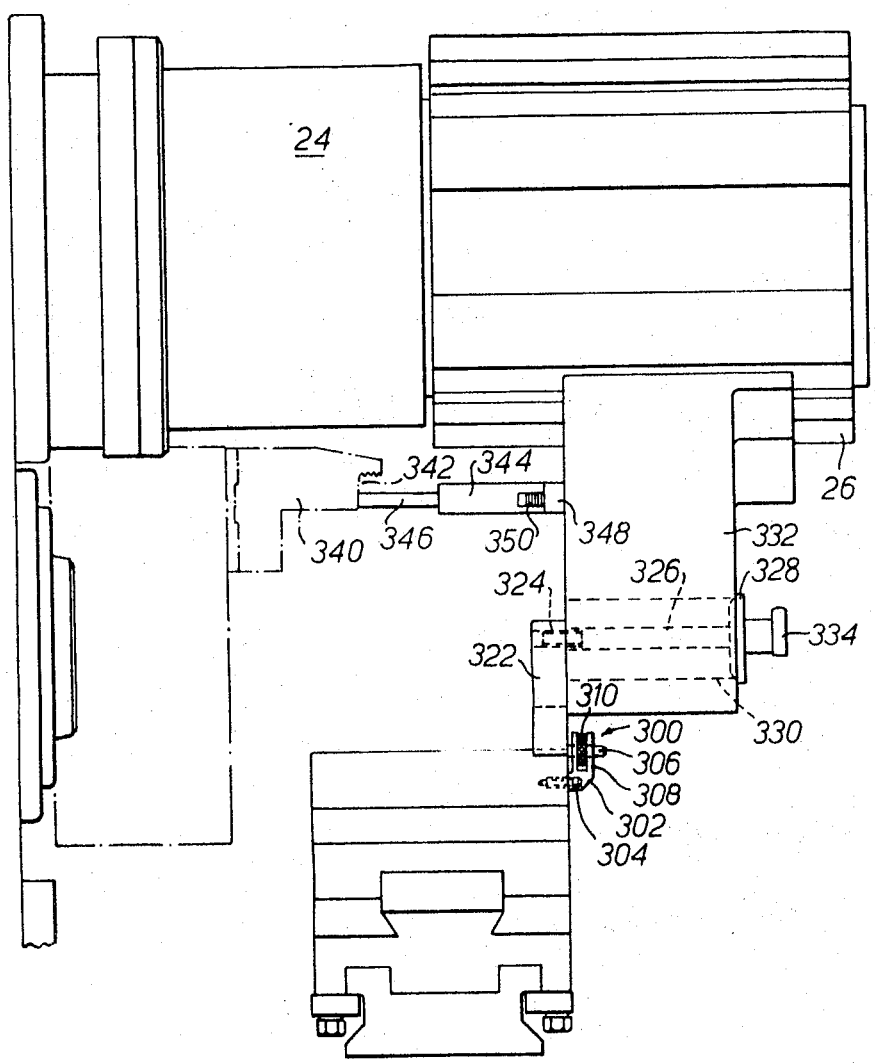
-FIG. 9.-

United States Patent Office 3,625,097
Patented Dec. 7, 1971

3,625,097
METHOD AND APPARATUS FOR SETTING CUTTING TOOLS IN MACHINE TOOLS
Leslie Harkness, Halifax, England, assignor to Warner Swasey Asquith Limited, Halifax, England
Filed Aug. 14, 1968, Ser. No. 752,604
Claims priority, application Great Britain, Sept. 15, 1967, 42,065/67
Int. Cl. B23b 1/00
U.S. Cl. 82—1 C                                8 Claims

ABSTRACT OF THE DISCLOSURE

A machine tool has front and rear cross slides with tool locating means thereon and a turret with a tool locating datum surface thereon. The cutting tools for the machine tool are preset prior to their being mounted on the turret and cross slides. The tools are preset by using apparatus which includes a first jig operable to preset tools for use on both the front and rear cross slides prior to positioning said tools on said cross slides and a second jig for presetting tools for use on said turret. Both jigs include a reference surface simulating the datum plane so that tools preset on said jigs are easily and quickly positionable on the machine tool with reference to the datum plane. The apparatus further includes a datum surface transfer arm having a transfer surface adapted to lie on the datum surface, and means for mounting said transfer arm on the turret so that the transfer arm is operable to facilitate positioning the tools on the cross slide.

---

The present invention relates to a method and apparatus for use in presetting tools prior to their being mounted in a machine tool.

It has been recognized that the productivity of a machine tool, such as a lathe, could be improved by presetting the cutting tools in their toolholder before fitting the toolholder in the machine tool. This is because, the presetting of the tools for one tool set-up can be done while the machine tool is in operation using a previous tool set-up.

One object of the present invention is to provide a method of presetting cutting tools for subsequent use in a machine tool and which is very simple to carry out and enables alterations in the workpiece location to be readily accommodated.

Another object of the present invention is to provide for new and novel apparatus for presetting cutting tools for use in a machine tool having a cross slide and a turret and wherein the apparatus includes a transfer means operable to facilitate positioning of the preset tools on the cross slide and the turret in a desired relationship relative to each other and to the workpiece.

Another object of the present invention is to provide a new and improved method of locating tools for use in a machine tool having a cross slide and a turret wherein a datum surface is provided on the turret, and the plane of location of the datum surface is transferred to the cross slides by a transfer means which may be mounted in the turret and extend toward the cross slides.

A further object of the present invention is the provision of a new and improved method for presetting tooling which includes the steps of locating a datum plane in relation to a workpiece locating surface in the machine tool and against which the workpiece abuts and presetting the tooling on a fixture separate from the machine tool having a reference surface simulating the datum plane by reference to the reference surface.

A further object of the present invention is the provision of a new and improved method and apparatus for presetting tooling, as noted above, wherein the end location surfaces of chuck jaws against which the workpiece abuts are used as the workpiece locating surface from which the datum plane is located.

The advantage of using a datum plane measured from a workpiece abutting surface, as noted above, is that if the surface is altered (e.g. by grinding hard jaws or turning soft jaws) then a fresh datum plane can be established and the tool carrier on the turret moved up to this plane. All the tools carried by the tool carrier will then be in the correct position without further adjustment.

The invention also comprehends apparatus for carrying out the aforesaid method, and in particular it includes within its scope presetting jigs.

According to this aspect of the invention a jig for presetting tooling ready for subsequent use on a machine tool comprises location support means for a toolholder, and reference surfaces fixed relatively to said location support means to provide for positioning the operative edge of a tool in three planes on said location support means.

The jig preferably simulates at least part of a tool carrier (this facilitating a visual appreciation of the tooling set-up) and where the tooling is for use on a lathe, it may simulate a tool carrier for mounting on the lathe cross-slide. In that case, one of the reference surfaces may be so positioned relatively to the location support means that it bears a known relationship to the axis about which the workpiece rotates on the machine.

Also in the case of a jig for presetting cross slide tooling, there may be a side plate providing an end location plane from which axial displacement of tooling can be located. Preferably there are two such side plates, to provide end location planes for tooling to be mounted in front and rear cross slides respectively.

These and other objects of the invention will become apparent from the following description of a preferred embodiment of the invention taken in conjunction with the accompanying drawings and in which:

FIG. 3 is a plan view of the jig shown in FIG. 2, but with three tools in position;

FIG. 4 is a view in the direction of the arrow IV in FIG. 3;

FIG. 5 is a vertical section through a height gauge for use with the jig shown in FIGS. 2, 3 and 4;

FIG. 6 is a plan view of a jig for turret-mounted tools;

FIGS. 7A and 7B combined are a side view partly in section of the jig shown in FIG. 6;

FIG. 8 is a detail sectional view on the line VIII—VIII in FIG. 7;

FIG. 9 is a front view of part of a chucking automatic lathe showing the method of setting tools in the lathe; and FIG. 10 is a detail end view of a transfer arm.

The present invention provides a new and improved method and apparatus for presetting cutting tools for use in a machine tool. Although the present apparatus and method associated therewith could be applied to various machine tools it is herein disclosed for use with a turret lathe having front and rear cross slides.

The illustrated embodiment provides a sophisticated yet easily operable system for presetting tools for use on the turret and the cross slides of a machine tool. The apparatus includes a pair of jigs, one operable to facilitate presetting tools relative to their respective toolholders or tool carriers for use in the turret and the other operable to facilitate presetting tools relative to their toolholders for use in both the front and rear cross slides. After the tools are preset relative to their respective toolholders they are transferred to the machine tool for mounting thereon. Prior to mounting the tools on the machine tool a datum plane is established on the turret. The cross slides contain tool locating means which are then located in a predetermined position relative to the datum plane on the turret by means of a transfer arm. The transfer arm is mounted on the datum surface of the turret and the tool locating means are then brought into engagement with the transfer arm. After the tool locating means are positioned the transfer arm is removed from the turret and the preset tools are placed on the turret and the cross slides.

For purposes of illustration and description the method of presetting tooling and apparatus for use in presetting tooling in accordance with the present invention is described as applied to an automatic chucking lathe. The lathe, illustrated in FIG. 1, comprises a box column 10 of substantial construction built on a bed 12. The column 10 houses the workpiece driving mechanism (not shown) and provides bearings for a spindle 14, on one end of which is mounted a chuck 16. The chuck may be of any known type with hardened or soft jaws according to the kind of workpiece which is to be gripped.

Figure 1:
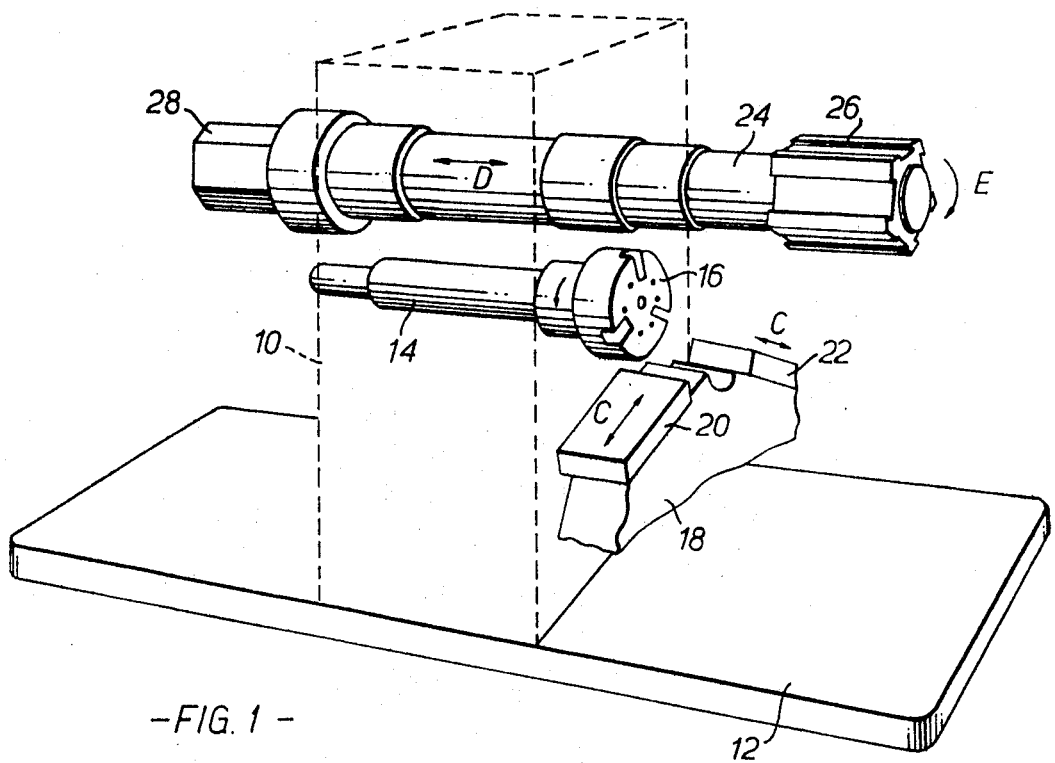
FIG. 1 is a diagrammatic perspective view of a chucking automatic lathe showing the principal components and their permitted movements.

A support bracket 18 fixed to the column 10 has upwardly and inwardly inclined cross-slides 20 and 22, on which can be mounted cross-slide tool carriers (not shown in FIG. 1). The cross-slide carriers can each move along their respective slides as indicated by the arrows C, C to feed their cutting tools into the workpiece. It will be observed that the cross-slide tools have no axial traverse, so that they can only be used for such operations as feeding, recessing, chamfering and parting-off.

A forged steel turret support bar 24 extends through the column 10 parallel with and above the spindle 14, and projects on each side of the column. At the chuck side of the column, the bar 24 is formed with a pentagon turret 26 near to its end, this turret having a dovetail recess in each of its five faces to receive a turret tool carrier.

The bar 24 is mounted and controlled so that it can reciprocate axially as indicated by the arrow D, and index about its own longitudinal axis, as indicated by the arrow E, in 72° steps to bring each of its faces in turn into an operative position on the underside. The bar indexes one or more steps between two successive reciprocations. On the opposite end of the bar 24 to the turret 26, there is a control cage 28 for mounting speed and feed control dogs (not shown), and other lathe controls are located in this area.

It will be observed that cutting tools fixed on the turret 26 will have a purely axial traverse so that they can be used for ordinary turning, drilling, boring, reaming and tapping operations, but not facing, recessing, parting-off, or taper turning. However, it is possible to fit on the turret a special toolholder which incorporates a small cross-slide and to arrange for inward movement of one of the cross-slide carriers equipped with a pusher which pushes the cutting tool across the small cross-slide on the turret to enable a boring bar to perform a recessing operation, or to enable a facing or parting tool on the turret to have its required lateral movement. Furthermore, the special toolholder can be provided with a roller following a cam fixed to one of the cross-slides, so that the tool on the turret turns (for example) a taper on the workpiece.

It will be appreciated that only the basic features of the lathe have been set out above. One essential feature in relation to the tool-setting procedure is that the cross-slide carriers and the turret bar have fixed working strokes and that the in-feed strokes always end against fixed stops. Thus, the size of the component produced on the lathe is determined solely by the location of the cutting edges of the tools relatively to the cross-slide carriers or the turret bar as the case may be. The setting apparatus procedure is intended to produce this correct location.

CROSS-SLIDE TOOL-SETTING JIG

Figure 2:
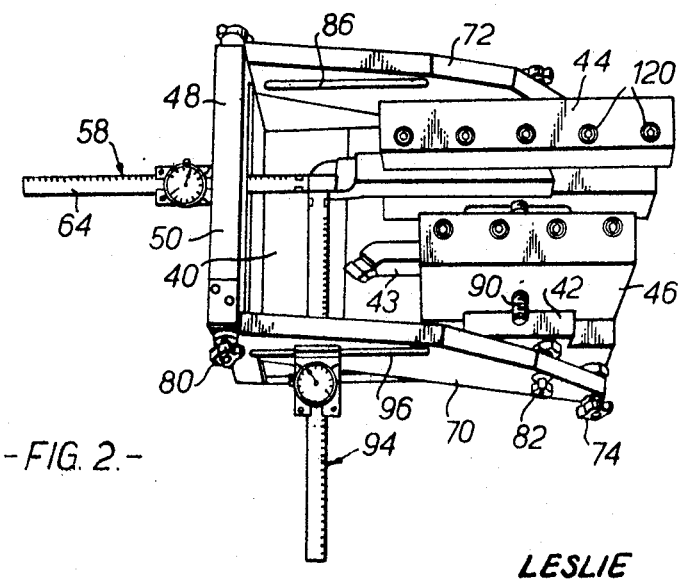
FIG. 2 is a perspective view from above of a presetting jig for cross slide tools, with two tools in position.

A jig as illustrated in FIGS. 2, 3 and 4 is provided for setting the cutting tools for use in the cross-slides of the lathe. This jig is separate from the lathe so that it can be used to pre-set tools while the lathe itself is in use on another job, and in some workshop conditions it may be possible to use a single jig to service several lathes.

The jig has a substantial hardened steel bed 40 which is formed with a dovetail portion 42 in exact replica of the dovetail portion on the cross-slide tool carriers, so that a toolholder can be fitted on to the bed 40 of the jig for tool setting purposes. Two toolholders 44 and 46 are shown in position on the bed 40 of the jig in FIG. 2 and three in FIG. 3. The toolholders are of conventional construction, with dovetail recesses in their undersides which enable them to be fitted on to the dovetail portions of the cross-slide tool carriers. When the toolholders are placed on the setting jig, they are firmly located longitudinally by the dovetail portion 42, but they can slide laterally on this portion as they could on the lathe tool carrier. In this respect, the bed of the jig simulates the actual tool carrier on the lathe, and it is a feature of this invention that the setting jigs do thus simulate tool carriers and so make it easier for the setter to visualize the effect of his setting procedure.

Two toolholders 44 and 46 are illustrated in FIG. 2, but it will be appreciated that this is only by way of illustration and that the jig could be used to get a single tool or more than two tools according to the tooling requirements of the cross-slide. The toolholders are of course, equipped with means for clamping to the cross-slide tool carrier, and these means can be used on the setting jig if necessary.

The top surface 48 of the bed 40 provides one of the reference surfaces of the jig for tool setting purposes, and it is therefore important that this surface should be flat and have a definite spacial relationship to the dovetail portion 42. A vertical rear wall 50 stands upright from the bed 40, and the front face 52 of this wall forms a second reference surface on the jig for toolsetting purposes. It is important therefore that this face 52 should be flat and at right angles to the top surface 48 of the bed. The front face 52 is spaced from the dovetail portion 42 of the bed by a distance less by a known amount, than the distance between the vertical plane passing through the axis of rotation of the workpiece spindle 14 of the lathe and the dovetails of the cross-slide tool carriers when the latter are pressed against their stops at the end of their in-feed movement. The radius of the portion of the workpiece which will be machined by a tool such as 41, will be equal to the perpendicular distance between the front face 52 and the cutting edge of the tool plus the known amount by which the face 52 is offset from the plane equivalent to the plane passing through the axis of rotation of the workpiece.

Two horizontal slots 54 and 56 are formed in the rear wall 50 each of which is adapted to receive a diameter gauge 58. The latter has a stock 60 with a flat front face 62 for engagement with the face 52 of the rear wall 50 of the jig, and a sliding scale rule 64 which can project from the stock through one of the slots 54 and 56 towards a tool mounted in a toolholder on the jig. The scale rule is divided to a suitable scale, but in addition there is a dial gauge 66 which is coupled to the rule so that very accurate readings are possible. The scale is calibrated so that it reads the radius to be turned by the tool. Of course, the scale could be calibrated to read off diameters rather than the radii if desired. The stock 60 of the scale is provided with a spring clip 61, whereby it is retained in the slot 54 or 56.

On the particular lathe for which the pre-setting has been designed, the tool carriers on the front and rear cross-slides are of the same size. This enables a toolholder to be used on either carrier, but if the same toolholder is to be capable of use on either slide, then the cutting tools must be set at different heights on the jig, because in use, those on the rear cross-slide will be inverted. Therefore, if a tool is to be set for use on the rear cross-slide of the lathe, it will need to be lower on its carrier than if it were to be mounted on the front cross-slide. For this reason there are two slots 54, 56 in the rear wall 50, so that the "diameter" gauge 58 can be mounted at different heights, the lower slot 56 corresponding to a tool for the rear cross-slide and the upper slot 54 corresponding to a tool for the front cross-slide.

The tool height relative to the axis of rotation of the workpiece can be adjusted by conventional means applied below the tool in the toolholder 44 or 46. Normally, the cutting edge of the tool should be about level with the axis of the workpiece. This height can be gauged by measuring from the reference surface provided by the top surface 48 of the bed 40, and a special invertible height gauge 68 illustrated in FIG. 5 is used for this purpose. This height gauge will be described separately. It will suffice to say that the height gauge can be used to set tools to the correct height for either the front or rear cross-slide.

Side plates 70 and 72 are provided one at each side of the bed 40. Each side plate is pivoted on a lower screw clamp 74, and has two slots 76 and 78 which engage on screw clamps 80 and 82 respectively when the side plate is raised to its operative position as shown in FIG. 4. When all three clamps 74, 80 and 82 appertaining to one side plate are tightened, the plate is held rigid with the bed and rear wall. One of the side plates must be lowered each time toolholders are fitted on to or removed from the dovetail portion 42.

The outside faces 84, 86 of the side plates provide third reference surfaces for the jig to enable the jig to be used to pre-set the axial position of the toolholders on the tool carrier. These outside surfaces each represent a datum plane on the lathe lateral of the workpiece. This datum plane bears a constant axial relationship to the workpiece when the latter is gripped in the lathe chuck and therefore it is possible to set the axial positions of tools to produce machined surfaces in the correct axial positions by reference to this datum plane.

Each toolholder for use on the cross-slides is formed with a lateral screwed hole 88, and an axial location peg 90 of hardened steel has a screw-threaded shank 92 for engagement in the hole 88. When the toolholder has been correctly positioned axially on the jig, the location peg can be adjusted in the toolholder until the peg touches the appropriate inside surface 85 or 87 of the side walls 70 and 72 respectively. This provides a means of transferring the axial location of a toolholder on the lathe cross-slide as will be described hereinbelow.

Two side plates 70, 72 are provided because the surfaces 84 and 85 on the plate 70 can be used to set tools for mounting in the front cross-slide, whereas the surfaces 86 and 87 on the plate 72 can be used to set tools for mounting in the rear cross-slide.

A length gauge 84 is provided, and this gauge is similar in construction with the "diameter" gauge 58. The length gauge can be clipped into a slot 96 in the side plate 70 or a corresponding slot at a lower level (appropriate to rear cross-slide tooling) in the plate 72, and when in this position it can be used to read the lateral position of a cutting tool on the jig as shown in FIG. 2.

It will be observed that both the "diameter" gauge 58 and the "length" gauge 94 can be read at the same time, and this is an important feature of the invention. In fact, the height gauge 68 can also be brought into operation at the same time if desired, so that all three location readings can be made simultaneously.

Referring to FIG. 3, in which there are three toolholders 44, 45 and 46, it will be observed that the toolholder 46 (also shown in FIG. 2) has a chamfering tool 43, while the extra toolholder 45 has a back chamfer tool 47.

Now the jig provided by the invention lends itself to the setting of chamfer tools. As shown in FIG. 3, the length gauge 94 is set to the length of the end face which is to be chamfered, and the "diameter" gauge is set to the radius at the bottom of the chamfer less the width of the length rule. The rules of these two gauges abut each other as shown in FIG. 3. The cutting edge of the tool 43 is then pushed to the corner of the length rule. The chamfer tool is then correctly set.

It will be observed that there are recesses 49 in the scale of the "length" gauge 94. The axial position of the cutting edge of a back facing tool can be measured against the face 99 of one of these recesses. The length of the front of the gauge between the end and the recess is known, so that this can be subtracted from the length measured on the scale to give the setting of the back facing tool. In FIG. 3, the gauges 94 and 58 are shown being used to measure the setting of a back chamfering tool 47.

HEIGHT GAUGE

Referring now to FIG. 5, the height gauge 68 comprises an open ended cylindrical column 100, with a dial gauge 102 in its top end and a dial gauge 104 in its lower end. These dial gauges are arranged with their faces directed outwardly, and their respective plungers 106 and 108 directed inwardly the gauges are held in position by screws 110.

An internal annular flange 112 provides a pivot mounting for a finger 114, which projects through a slot in the cylindrical wall of the column 100.

The plungers 106 and 108 are loaded inwardly by compression springs 107 and 109 reespectively. A restricting screw 116 is fixed in the flange 112, and projects into a hole 117 in the tail 118 of the finger 114. The spring 109 is stronger than the spring 107 causing the tail 118 of the flange 112 to be normally pressed on to the underside of the pointed end of the screw 116. The screw 116 serves to prevent large deflections of the plungers 106 and 108, which could damage the dials 102 and 104, but permits small displacements such as the dials are intended to record. It will be observed that the finger 114 is further from the lower end of the column 100 than it is from the upper end. The arrangement is such that the underside of the finger is at the same level as the plane corresponding to the correct height setting for a cutting tool for use on the front cross-slide when the gauge 68 is standing upright on the surface 48 of the bed 40 and the finger 114 is horizontal, whereas when the gauge 68 is inverted and stood on the surface 48, the underside of its finger 114 (previously the top side) is at the correct center height for tools to be used on the rear cross slide.

The plungers 106 and 108 are of unequal length, and engage on opposite sides of the tail 118. The dials 102 and 104 are both set at zero with the finger 114 horizontal.

In use, if a cutting tool is being set for use in the front cross-slide of the lathe, the gauge 68 is placed in an upright position on the bed 40 and the finger 114 is brought into engagement with the cutting edge of the tool. As soon as the tool is above the correct center height, the finger 114 is tilted upwards, the tail 118 is lowered and the plunger 106 extends to produce a reading on the dial 102. In this manner it is possible to set the height of the tool accurately. When the tool is accurately set in the toolholder the clamping screws 120 are tightened to lock the tool in a set position.

If the cutting tool is for use in the rear cross-slide of the lathe, the same height setting procedure is followed, but the gauge 58 is used in the inverted position and the reading is obtained on the dial 104.

TURRET TOOL-SETTING JIG

The pentagon turret 26 on the lathe (FIG. 1) provides for mounting five tool carriers each of which can carry drills, boring bars, taps, dies, length cutting tools or crosscut tool attachments. It will be appreciated, that five carriers represents the maximum tool loading of the turret and that for the machining of particular components it may not be necessary to use all five carriers.

A turret tool-setting jig is provided separate from the lathe, and as with the cross-slide setting jig, there may be one turret jig for each lathe, or a single turret jig may serve several lathes. The turret-setting jig is illustrated in FIGS. 6 and 7, and comprises basically a block 140 which is of substantially the same shape as the tool carriers used on the turret of the lathe.

The block is formed with accurately positioned holes 142, 144, 146 and 148 in the same positions as toolholder holes in the carriers on the lathe. Of these, the holes 142 is positioned so that is simulates a carrier hole which is co-axial with the lathe spindle 14 when that carrier is brought to the operative position by indexing of the turret. On the tool carrier, this hole (coresponding to the hole 142) is used for drills and like tools which have to be set coaxial with the workpiece. The other three holes of the carrier (simulated by the holes 144, 146, 148 in the jig block) are intended to receive toolholders such as that shown in FIGS. 6 and 7, having a cylindrical shank 150 which fits into the hole in the carrier and a body 152 in which the actual cutting tool such as 154 is received in a slot or recess 156 and can be locked therein by screws (not shown).

The shank of each toolholder is formed with two diametrically opposed longitudinal grooves 160, and a part or location collar 162 is provided for each tool, the collar or part fitting loosely around the shank 150, but having a detent 164 and an opposed setscrew 166 for engagement in the grooves 160. The setscrew 166 is not diametrically opposed to the detent 164 on the collar, but is offset to one side of the diametrically opposed position. By tightening the setscrew 166, the collar can be locked on to the toolholder shank in any preselected longitudinal position, and the offsetting of the setscrew 166 ensures correct angular location of the collar on the shank. A lug 168 is provided on the collar 162, and there is a hole 170 in this lug to receive a fixed location peg on the tool carrier. Each of the holes 144, 146, 148 has an associated peg 174, 176 and 178 which have the same disposition on the block 140 as the location pegs on the tool carrier. The appropriate peg, 174, 176 or 178 can be received in the hole 170 of a collar 162 and there are opposed setscrews 180 in the lug 168, which can be tightened on to the peg to locate the collar and thereby orientate a toolholder gripped by the collar relatively to the hole in which the shank of the toolholder is received.

The adjustment of the toolholder about the axis of its own shank enables its tool to be set at the correct center "height" for cutting purposes. The term "height" is used in this respect for convenience although strictly speaking no vertical dimension is involved with a tool set on the turret. In addition to the holes simulating the toolholder holes in the tool carrier, there is an additional hole 145 with its longitudinal axis a predetermined distance from the axis of the hole 142.

The block 140 is placed on a bed (not shown) which incorporates a manually operable lifting device having lifting elements projecting upwards into each of the holes 144, 145, 146, and 148 on which the lower end of the toolholder shanks 150 rest. Thus, toolholders placed in the block 140 can be raised or lowered by operation of the lifting device, and all the toolholders will be moved through the same vertical distance whenever there is vertical adjustment.

It will be appreciated that the top surface 149 of the block 140 simulates a vertical surface on the actual tool carrier when the latter is in position on the lathe turret, and therefore the height of the cutting tool above the top of the block 140 represents an axial setting of the tool on the lathe. This setting has to be such that for a given datum position of the face of the carrier (the setting of which will be described later) the cutting tools in that carrier will arrive at the correct axial position relative to the chuck jaws to produce machined surfaces of the correct length when the turret bar 24 arrives at the end of its in-feed.

Locking means are associated with each of the holes 142, 144, 145, 146 and 148 to enable a shank to be locked in a pre-set position on the block 140. These locking means are of a conventional nature and need not be described in detail. A long screw 182 extending through from a part of the block has a pressure pad at its rear end for engagement with the shank of a toolholder in the hole 145. Similarly, a screw 184 extends from one side of the block to apply pressure on the shank in the hole 142. Each of the holes 144, 146 and 148 is equipped with a double wedge operated clamp 190, the wedge being operable by a screw 192. These screws 182, 184 and 192 all have hand knobs 186, 188 and 193 respectively so that light pressure can be applied to their respective toolholder shanks, and the locking and unlocking of toolholders in the holes 142, 144, 145, 146 and 148 is very easy.

A bracket 194 is bolted to the rear of the block 140, and a cylindrical column 196 stands vertically upwards from this bracket. Through the column 196 there extends a spindle 198 which can turn about its own longitudinal axis, but which is locked against endwise movement. An arm 200 is fastened at one end to the top end of the spindle 198, this arm extending horizontally from the spindle.

The arm 200 can be turned about the spindle axis, and locked in any selected angular position by a clamping member 202 having a screwed part 204 on which there engages a knob 206 (see FIG. 8). This enables the arm 200 to be brought over any part of the block 140, or moved clear of the block to allow toolholders to be fitted.

A "length" gauge 208 is provided, this gauge being of the same type as the gauge 58 previously described, and it fits in an elongated slot 210 in the arm 200, and extends downwardly therethrough as illustrated in FIG. 7. The perpendicular distance between the topside of the arm 200 and the top surface of the block 140 is predetermined and the scale of the gauge 208 is so arranged that the gauge reads the extension of a tool from the face of the block 140, and, as will be described later, this gives the finished length dimension of the front of the workpiece to be machined by that tool.

A special "radius" gauge 212 is also provided for use with the turret jig. This gauge has a stock 214 with a sliding calibrated scale 216, and in these respects it resembles the gauges 58 and 208. However, the stock is rotatably mounted on a head 217, from which a cylindrical shank 218 extends downwardly, and this shank fits in the hole 142 (which it will be remembered is the hole simulating the hole coaxial with the workpiece). A screw 219 is provided for locking the stock to the head 217.

The shank 218 can be locked axially by the screw 184, which carries a non-rotatable insert 185, this insert having opposed flats to produce a key which engages on the side walls of a longitudinal recess 187 in the shank 218. The end of the screw 184 is pressed against the bottom of the recess 187 when the screw 184 is rotated. Furthermore, the shank is offset relatively to the stock, so that when the shank is located in the hole 142 the calibrated edge 220 of the scale passes through the axial center line which is equivalent to the axial center line of the workpiece on the lathe.

Another feature of the "radius" gauge is that the end face 222 of its scale passes through the axial center line equivalent to the axial center line of the workpiece when the scale is reading zero, but the end face 222 is at right angles to the calibrated edge of the scale. Consequently, when the scale is reading zero, the corner of the scale at the junction of its calibrated edge and its end face 222 represents the axis of rotation of the workpiece. This axis is also that about which the stock is rotatable on the head 217.

It will be appreciated therefore that when the scale 216 is extended to touch the tip of a cutting tool mounted in any one of the holes 144, 146, 148, it measures directly from the said corner the radius which would be machined by a tool set in that position.

A further accessory for use on the turret jig is a tool alignment gauge 224. This simply consists of a magnetic block 226 having a flat inside surface 228 which locates on the side wall of a toolholder body 152, and a rod 230 slidable but not rotatable in a longitudinal hole in the block 226 with a hardened steel peg 232 slidable in a hole at the front end of the rod at right angles to the permissible movement of the rod. A screw 234 is provided for locking the peg 232 in any selected extended position.

SETTING A TURNING TOOL ON THE TURRET JIG

If a turning tool such as 154 is to be used on a carrier on the lathe turret, it will be preset on the jig which has just been described. The tool will be held in a toolholder, and the setter will select into which of the holes 144, 146 and 148 the toolholder is to be fitted—depending upon the diameter of the workpiece which is to be turned by that tool and any other tools which are to be used on the same tool carrier. In any event, the procedure for tool setting is the same whichever of the holes is selected.

The setter will also know what will be the axial position of the datum face of the tool carrier on the lathe as this will have been determined by planning to ensure the minimum tool projection from the carrier. This axial position will be represented by the top surface of the block 140.

The toolholder is mounted in the selected hole and lightly clamped. Then the tool alignment gauge 224 is placed on the side of the toolholder body (FIG. 6) and the height peg 232 is set so that it just touches the top of the tool cutting edge, and locked by the screw 234. The rod 230 of the alignment gauge is then slid forwardly to a position where its peg is aligned with the projecting part of the scale 216 (which at this stage will be retracted to near the zero setting). The toolholder is then released and turned until the peg 232 just touches the calibrated edge of the scale 216. This procedure ensures that the cutting edge of the tool is at the correct center "height" and at this state, the collar 162 is clamped on to the tool shank by the setscrew 166 and the screws 180 are brought to bear lightly on the locating peg 176 (see FIG. 6). At this stage, the angular relationship of the toolholder to the carrier has been selected.

Next, the scale 216 of the radius gauge 212 is extended to a somewhat larger radius than the tool is required to cut, and the rod 230 is slid back in its block 226 until it is near to the zero end of the scale 216 (i.e. the outer extremity of the scale). The stock of the radius gauge 212 is then turned on its own axis until the scale touches the height peg 232. The gauge 212 can then be locked by tightening the screw 184 and the screw 219 and the angular position and height of this gauge are then fixed. The tool is then extended from its holder to push the scale 216 until the required radius to be cut by the tool is read on the radius gauge 212, whereupon the tool can be locked in its toolholder, and the active radius of the tool has been selected.

To set the axial portion of the tool, the scale of the length gauge 208 is set above the cutting edge of the tool at a slightly smaller reading than that ultimately required to produce the correct length on the workpiece. Then the setscrew 166 is slackened and the toolholder is raised pushing the scale of the length gauge until the latter registers the required length. The setscrew 166 is then locked, care being taken to assure that the collar 162 remains on the locating peg 176 and in engagement with the face of the block 140. The toolholder is then properly preset for use on the lathe. If desired, the radius can again be checked by the scale 216, so that readings of radius, length and center height can be viewed simultaneously.

PRE-SETTING BORING BARS

Boring bars are pre-set on the turret setting jig and the hole 145 is used for this purpose. Since the axis of the boring bar is the same as the workpiece axis, it is not necessary to set the tool "height." Consequently, the angular position of the cutter is immaterial.

Each boring bar has four longitudinal flats spaced at 90° on its shank, and the long screw 182 can be tightened against one of these flats to lock the bar.

The head 217 of the radius gauge 212 has a fixed stop 221, and a peg 223 is provided on the stock 214 for engagement with the stop. The stop is so arranged that when it is engaged by the peg 223, the calibrated edge of the scale 216 is pointed towards the longitudinal axis of the hole 145.

In setting a boring bar, the stock of the gauge 212 is brought into this stop-engaged position and locked by the screw 219. The tool is adjusted until, when revolved about the axis of the hole 145, it pushes the scale 216 to the required radius. Then the tool is clamped in the boring bar and the bar elevated by the lifting mechanism until its cutting edge is at the correct axial position (as measured by the "length" gauge). The cutting tool is locked by its locking screw and a collar on the shank is pressed against the top surface of the block 140 and then locked to the shank, the boring bar is then set ready for use in the lathe.

PRE-SETTING TURRET SLIDE HEAD TOOLS

Internal machining operations such as facing, counterboring, grooving, forming and back facing can be performed by a turret slide head attachment. This comprises a metal block having a dovetail projection to fit on one of the sides of the turret in place of one of the tool carriers previously referred to. This block has a slideway with a slide member so arranged that it can travel across the block laterally of the lathe. Generally, the slide member is spring loaded so that it normally rests at one end of its permitted traverse, and it has one or more holes parallel with the axis of rotation of the workpiece to receive the shanks of cutting tools (which are frequently boring bars).

Such an attachment permits the shank of a toolholder to be offset from the axis of rotaiton of the workpiece, and it also permits the tool to be moved (say by late operation of the lathe cross-slides) to cut a recess in a bore or to carry out taper turning operations.

Such a tool is placed in the hole 145 and is set for radius and length in much the same manner as a boring bar. The shank of the cross-slide tool also has four flats to enable it to be locked at 90° positions.

With this kind of tool, the alignment with the axis of rotation of the workpiece will affect the radius cut by the tool. Misalignment, therefore, has to be measured and allowance made in the radius setting. For this purpose, a special alignment gauge 240 (FIG. 7) is provided, and this gauge consists of a magnetic stock 242, a scale 244 fixed to the stock, two fingers 246, 248 slidable on the scale, and a dial 250 operative by either of the fingers. Each of the fingers 246, 248 has a gauging edge 252, 254, respectively, and these edges lie in the same plane when at the zero position but the edge 252 faces the column 196 whereas the edge 254 faces in the opposite direction.

The shank of the toolholder is turned through 90° from the position at which the radius is set, and then the gauge 240 is used to measure the displacement of the tool from true alignment. The two fingers 246 and 248 are required to provide for tools on either side of the toolholder (i.e., operating as front or rear cross-slides) and for forward or reverse rotation of the lathe spindle. When the displacement has been read on the dial 250, appropriate allowance can be made in the tool radius setting.

SPECIAL ADAPTATION OF THE LATHE FOR PRE-SET TOOLING

Very little modification as adaptation of the lathe itself is required and this is an advantage of the invention. A location stop is provided on each cross-slide, a location transfer arm is provided for use on the turret, and it is necessary to have a set of length gauges. Each of these items will now be described in turn.

Location stop

FIG. 9 shows a loctaion stop 300 on the front cross-slide. It will be understood that there is an identical stop on the rear-slide, so that only the front stop need be described in detail. A bracket 302 is fixed onto the side of the tool carrier on the cross-slide by set screws 304, and this bracket projects above the dovetail portion of the tool carrier. A hardened steel stop screw 306 passes through aligned holes in a bifurcated portion 308 of the bracket 302, there being a knurled nut 310 engaged on the screw 306 in the bifurcated portion.

By turning the nut 310, the projection of the screw stop on the tool carrier side of the bracket can be adjusted. Thus it is possible to set this end of the screw stop to any selected datum plane on the lathe. When this position has been selected a toolholder can be removed from the cross-slide jig and placed on the tool carrier of the cross-slide, with its location peg 90 engaged against the end of the screw stop 306, and that tool will then be correctly positioned on the lathe.

Transfer arm

FIG. 10 shows that the transfer arm comprises a two-armed member 320 having a central boss 322 in which there is a screwed hole 324. A clamping bolt 326 has a collar 328 with a chamfered side whereby it can be located in one end of the lowest hole 330 in a tool carrier 332 on the lathe turret 26. A knob 334 is provided on the collar end of the bolt 326, and the other end is screwed for engagement in the screwed hole 324 of the transfer arm.

The transfer arm can be fitted to any of the tool carriers on the turret, and this is done by passing the shank of the bolt 326 through the hole, as shown in FIG. 9. When the bolt is tightened, the boss of the transfer arm is pulled tight against the face of the tool carrier 332. The arms 336 and 338 of the transfer arm then extend in line with the location stops 300 of the front and rear cross-slides, and these can then be brought to bear on the arms 336 and 338 so that the location stops and the front face of the carrier 332 are all in the same plane (herein referred to as the endwise location plane).

The facility for quick alignment of the location stops with the front face of the turret tool carrier, which is provided by the transfer arm is very useful in the setting of the machine and resetting after adjustment of the workpiece location surfaces.

Length gauges

The length gauges are used between the end location surface for the workpiece (i.e., a face of the chuck jaws 340, such as 342—FIG. 9) and the front face of the tool carrier 332. A body 344 has a recess at one end to receive any one of a series of rod length gauges (one of which is shown at 346) to provide large increments of length adjustment, and at the other end it has a head 348 with provision for slip gauges 350 to be inserted for small length increment adjustment.

Setting the tooling

It is preferable that the tooling be planned so that the setter has charts showing which tools are to be fitted in each of the five turret and two cross-slide tool carriers. The tool planning should also establish the distance of the front faces of each turret tool carrier (datum plane) from the end location surface on the chuck jaws at the end of the in-feed of the turret. The five datum planes will be selected to give the minimum overhang of tools from the carrier.

The setter then moves the turret against the end stop at the limit of its in-feed and proceeds to set each of the turret carriers to its own datum plane by the use of the length gauges. At the planning a datum plane will have been selected for the end stop of the cross-slides of the lathe, which may or may not be one of the datum planes of the turret tool carriers. One of the turret carriers is set to this special datum plane and the transfer arm is fitted to this carrier and the plane transferred to the end location stop on the cross-slide. The turret tool carrier which has been used for this purpose can then be set to its own datum plane.

At the planning stage it is desirable that all the datum planes selected for the cross-slide end stops and the turret carriers should be the same or spaced from each other by distances which are exact multiples of the large increment adjustment stops provided by the rods 346 of the length gauges. This avoids the necessity for changing the slip gauges 350 during a lathe tooling operation. The lathe itself is then ready to receive the tooling. All tools are present on the appropriate jigs as previously described, and then the toolholder with the tools in position are simply transferred to the lathe and clamped in position in the normal manner. The turret tools are located by their pegs. The lathe is then ready for use.

Supposing that fresh chuck jaws have to be fitted on the jaws ground or turned, this will, of course, alter the workpiece end location surfaces. The length gauge is then used to reset the carrier on the turret and the new datum plane is transferred to the cross slides by the transfer arm, so that operations can recommence. But it will not be necessary to reset any of the tools since they will all maintain their correct location relative to the workpiece location.

It will be appreciated that the entire operation of tooling is very simple besides the saving in time due to the ability to set the tools while the lathe is working on a previous job.

In the above example, the lathe described has a turret which is rotatable about an axis parallel with the axis of rotation of the workpiece. It should be understood however, that the invention could be applied to a lathe having a turret rotatable about an axis which is not parallel with the workpiece axis by suitable modification of the gauges used on the turret tool-setting jig and the transfer arm.

It will also be appreciated that although various dial gauges have been illustrated and described, it wuold be possible to use vernier gauges instead.

In a modification, the screw and location pegs 90 used to set the toolholders on the cross-slide jig are replaced by plain cylindrical pegs and the holes 88 are not screw threaded, so that the location pegs can be slid up to their reference surfaces 85 and 87. Screws extend longitudinally into the toolholders to engage with and lock the location pegs when these have been set. This modification provides more accurate setting because it reduces errors due to the "feel" of a screw setting, and also it is more rapid than the screw setting.

Although the present invention has been described above to a somewhat detailed extent, the invention is not limited to any particular construction, and it is my intention to cover hereby all adaptations, modifications, and changes thereof which come within the practice of those skilled in the art to which the invention relates and within the scope and spirit of the appended claims.

Having described my invention, I claim:

1. In a method of locating tools for use in a machine tool having a cross slide and a turret, the steps of providing a datum surface on the turret, positioning a datum surface transfer means with a transfer surface thereof lying on the datum surface, adjusting tool locating means on the cross slide to engage the transfer surface of the transfer means, and positioning preset cross slide cutting tools on the cross slide at predetermined distances from the tool locating means.

2. In a method as defined in claim 1, the step of positioning preset turret cutting tools on the turret at predetermined distances from the datum surface.

3. In a method of locating a tool for use in a machine tool as defined in claim 1, the steps of positioning the datum surface at a distance from a surface against which the workpiece abuts when located in the machine tool, the datum surface comprising a surface on a tool carrier mounted on the turret, and effecting the positioning of the datum surface by adjustment of the tool carrier relative to the turret.

4. Apparatus for use with a machine tool having a cross slide with tool locating means thereon and a turret having a tool locating datum surface, said apparatus comprising a datum surface transfer means having a transfer surface adapted to engage the datum surface, means for mounting the transfer means on the turret, said transfer surface being extensible adjacent the tool locating means on the cross slide when the transfer means is mounted on the turret, and adjustable means for adjusting the tool locating means to position a tool locating surface thereof in engagement with the transfer surface.

5. Apparatus for use with a machine tool as defined in claim 4 wherein the datum surface transfer means comprises a transfer arm and wherein the adjustable means comprises a movable stop for locating tools on the cross slide.

6. Apparatus for use with a machine tool as defined in claim 4 wherein the machine tool further includes a chuck for holding a workpiece and which chuck has a workpiece engaging surface which engages the workpiece when located in the chuck and said apparatus further including means for locating the datum surface at a predetermined distance from the workpiece engaging surface.

7. Apparatus for use with a machine tool as defined in claim 6 wherein said last-recited means comprises a guage for setting the distance between the workpiece engaging surface and the datum surface and wherein the datum surface comprises a surface of a turret tool carrier adjustably positionable on the turret so as to vary the distance between the workpiece engaging surface and the datum surface.

8. A method of locating tools for use in a machine tool having a rotatable spindle and a tool-carrying turret indexible about an axis parallel to the spindle axis and movable longitudinally of its axis of indexing movement parallel to the spindle axis, said method including the steps of providing a datum plane located on the turret and extending transverse to the direction of indexing rotation of the turret and the spindle axis, said datum plane comprising a surface of a tool carrier mounted on the turret, locating the datum plane a predetermined distance from a surface against which the workpiece abuts when located in the rotatable spindle by adjusting the tool carrier relative to the turret, presetting tools with respect to the datum plane, and positioning the preset tools on the tool carrier at a location with respect to the datum plane corresponding to the preset location thereof.

References Cited
UNITED STATES PATENTS

| | | | |
|---|---|---|---|
| 3,292,267 | 12/1966 | Wilterdink et al. | 33—185 |
| 3,333,493 | 8/1967 | Bullard III et al. | 82—36 |
| 3,417,478 | 12/1968 | Jeanneret | 33—185 |
| 3,490,318 | 1/1970 | Jones | 82—1 |

LEONIDAS VLACHOS, Primary Examiner

U.S. Cl. X.R.

33—181, 185